Patented May 18, 1954

2,678,878

UNITED STATES PATENT OFFICE 2,678,878

PLANT GROWTH REGULANTS CONTAINING ARYL AND HALOARYL ESTERS OF ARYL AND HALOARYL SULFONIC AND THIOSULFONIC ACIDS

William D. Stewart, Brecksville, Ohio, assignor to The B. F. Goodrich Company, New York, N. Y., a corporation of New York No Drawing. Application April 6, 1950, Serial No. 154,443

12 Claims. (Cl. 71—2.6)

This invention relates to plant growth regulants and pertains particularly to compositions which alter or regulate the growth of plant cells by reason of their containing as an essential active ingredient aryl and haloaryl esters of aryl and haloaryl sulfonic and thiosulfonic acids, and to methods in which the growth characteristics of plants are modified by the application of such compounds.

I have discovered that aryl and haloaryl esters of aryl and haloaryl sulfonic and thiosulfonic acids have a marked effect on plant cell growth and that compositions containing such a compound as an active ingredient, together with an inert carrier, are useful in a variety of ways to regulate the growth characteristics of plants.

For example they may be applied to seeds and tubers (which for the purposes of this invention are to be regarded as plants in the dormant stage) to stimulate germination and plant emergence or to inhibit sprouting or to stimulate development of roots; they may be applied to cuttings and transplants to stimulate root formation and root growth; they may be applied to fruit trees to reduce the number of set fruit or to delay or prevent premature drop of buds, leaves and fruit or to ornamental plants to delay fall of leaves and needles; they may be used for fortifying fertilizers and plant food to enhance growth and increase yields of various agricultural products; they may be used to induce modifications in leaf structures to enhance productivity of a variety of plants; they may be used to induce parthenogenesis and thereby aid in the development of seedless berries and fruit; and they may be employed in various other ways to produce useful histogenic and morphogenic changes in plants. In such applications compositions containing from about 0.01% to 1% by weight of the active ingredient are applied to at least some of the cells of the living plant structure, whether dormant or in active state of development or growth, and the plant structure is thereafter maintained under conditions normally favoring development or growth. Compositions containing higher concentrations of the active ingredient, from about 1% to 10% by weight so alter the growth characteristics of actively growing plants upon which they are applied as to cause the death of such plants, hence such compositions are useful as herbicides.

The esters of aryl and haloaryl sulfonic and thiosulfonic acids which are the active ingredients of the compositions of this invention can be illustrated by the following general formula: Y—SO$_2$—A—Y' where Y and Y' are aryl or haloaryl groups and A is a sulfur or oxygen atom. It is preferred that groups Y and Y' contain six to ten carbon atoms, and from two to ten halogen atoms. The preferred compounds of this class are the halophenyl esters of halobenzene sulfonic and thiosulfonic acids which have two halogen atoms on the benzene ring.

Among the specific compounds of the class illustrated by the general formula above there are for example such compounds as: phenyl-4-bromobenzene sulfonate, phenyl-4-iodobenzene sulfonate, phenyl-4-bromobenzene thiosulfonate, phenyl-4-chlorobenzene thiosulfonate, 4-bromophenyl 4-bromobenzene sulfonate, 4-fluorophenyl 4-fluorobenzene sulfonate, 4-chlorophenyl 4-chlorobenzene sulfonate, 4-iodochlorophenyl-4-iodochlorobenzene sulfonate, 4-chlorophenyl 4-chlorobenzene thiosulfonate, 2,4-dichlorophenyl 2,4-dichlorobenzene sulfonate, 2,4-diiodophenyl 2,4-diiodobenzene sulfonate, 2,4-dibromo 2,4-dibromobenzene sulfonate, 2,4-difluorophenyl 2,4-difluorobenzene sulfonate, 2,4-dichlorophenyl 2,4-dichlorobenzene thiosulfonate, 2,5-dichlorophenyl 2,5-dichlorobenzene sulfonate, 2,5-dichlorophenyl 2,5-dichlorobenzene thiosulfonate, 2,4-dichlorophenyl 2,5-dichlorobenzene sulfonate, 2,4-dichlorophenyl 2,5-dichlorobenzene thiosulfonate, 2,4,6-tribromophenyl 2,4,6-tribromobenzene sulfonate, 2,4,6-tribromophenyl 2,4,6-tribromobenzene thiosulfonate, 2,4,5-trichlorophenyl 2,4,5-trichlorobenzene sulfonate, 2,4,5-triiodophenyl 2,4,5-triiodobenzene sulfonate, 2,4,5-trichlorophenyl 2,4,5-trichlorobenzene thiosulfonate, phenyl 3-bromo-5-pseudocumene sulfonate, phenyl 3-chloro-5-pseudocumene thiosulfonate, 2,4-dichlorophenyl-3-chloro-5-pseudocumene sulfonate, 2,5-dichlorophenyl 3-chloro-5-pseudocumene thiosulfonate, phenyl 4-chlorotolyl-4-chloro-m-toluene sulfonate and thiosulfonate, 2,4-dichlorophenyl 4,5-dichloro-m-toluene sulfonate and thiosulfonate, 4,5-dichlorotolyl 4,5-dichloro-m-toluene sulfonate and thiosulfonate, 4,6-dichlorotolyl 4,6-m-toluene sulfonate and thiosulfonate, 2,3-dichlorotolyl 2,3-dichloro-p-toluene sulfonate and thiosulfonate, phenyl 3-chloro-2,4-xylene sulfonate and thiosulfonate, 4-phenyl 3-chloro-2,4-xylene sulfonate and thiosulfonate, 2,5-dichlorophenyl-4-chloro-2,5-xylene sulfonate and thiosulfonate, 2,4,6-tribromophenyl 3-bromo-2,6-xylene sulfonate and thiosulfonate, 3 - bromoxylene 3 - bromo - 2,6 - xylene sulfonate and thiosulfonate, phenyl 2,4-dichloro-1-naphthalene sulfonate and thiosulfonate, 4-phenyl-2,4-dichloro-1-naphthalene sulfonate and thiosulfonate, and 2,4-dichlorophenyl- 1-naphthalene sulfonate and thiosulfonate among others.

The aryl and haloaryl esters of aryl and haloaryl sulfonic acid are in general prepared by first forming an aryl or haloaryl sulfonyl chloride, as by reacting an aromatic sulfonic acid with $PCl_5$, and then reacting the sulfonyl chloride with a phenolic compound or a halogenated phenolic compound. The aryl and haloaryl esters of aryl and haloaryl thiosulfonic acids can be prepared in a manner analogous to the esters of the sulfonic acids except that an aryl or haloaryl thiosulfonyl chloride is reacted with a phenolic compound or a halogenated phenolic compound.

Compositions containing such compounds useful for plant regulating purposes include solutions in organic solvents, aqueous compositions and dusts and can be readily and conveniently prepared as hereinafter described. Solutions in organic solvents containing any of the active ingredients hereinbefore named are prepared by dissolving a sufficient amount of the active ingredient in an appropriate organic solvent to give the desired concentration. Such solvents as the alcohols, acetones and liquid petroleum fractions are suitable solvents. Where solutions are to be used to stimulate plant cell growth as in root initiation, a non-phytotoxic solvent should be used.

Aqueous compositions can be prepared with or without a wetting or dispersing agent. Where aqueous compositions which do not contain a wetting or dispersing agent are desired, the active ingredient is first dissolved in the smallest amount of water-miscible solvent in which the active ingredient will dissolve and then the resulting solution is added to sufficient water to obtain the desired concentration of the active ingredient. Ethyl alcohol and acetone are excellent solvents for this purpose. Two types of aqueous compositions containing a wetting or dispersing agent may be prepared. One type is prepared by first dissolving the active ingredient in a water-immiscible solvent, such as kerosene, and then dispersing the resulting solution in an aqueous solution of a wetting or dispersing agent. The other type is prepared by dispersing the active ingredient in an aqueous solution of a wetting or dispersing agent.

Dust also can be prepared with or without a wetting or dispersing agent but the latter, (a dust formulation containing a surface active agent) is preferred. In preparing the dust formulations, the active ingredient is uniformly dispersed throughout the entire mass of a finely-divided pulverulent solid such as talc, diatomaceous earth, clays, or calcium carbonate by means of a ball mill, pebble mill or any other mechanical device. When a surface active agent is used it can be added to and mixed with the other ingredients.

Suitable dispersing or wetting agents which can be used to prepare the above-described compositions can be typified by the following general classifications: sodium and potassium salts of fatty acids known as soft and hard soaps; salts of disproportionated or hydrogenated abietic acid known as rosin soaps; salts of the hydroxy-aldehyde acids present in seaweed known as algin soaps; alkali-casein compositions; water-soluble lignin sulfonate salts; long-chain alcohols usually containing 10 to 18 carbon atoms; water-soluble salts of sulfated fatty alcohols containing 10 to 18 carbon atoms; water-soluble salts of sulfated fatty acid amides; water-soluble esters of sulfated fatty acids; water-soluble alkyl sulfonates having on the average of 16 carbon atoms in the alkyl group; water-soluble aryl sulfonates; water-soluble alkyl aryl sulfonates; water-soluble aralkyl sulfonates; water-soluble sorbitan mono-laurate, -palmitate, -stearate, and -oleate; quaternary ammonium alkyl halides; fatty acids saponified with amines and amino alcohols; blood albumen; and others. These materials are sold under numerous trade names either as pure compounds or mixtures of compounds of the same class and mixtures of these compounds with fillers or diluents.

When the above dispersing or wetting agents are employed to prepare the plant growth regulating composition containing the ester of sulfonic and thiosulfonic acids hereinbefore described as active ingredients, it is generally desirable to use only from 0.01% to about 1% by weight of the wetting or dispersing agent depending on the efficiency of the specific dispersing or wetting agent.

The following specific examples illustrate compositions of this invention and their utility.

*Example I*

Young potted tomato plants were immersed for 30 seconds in an aqueous dispersion containing 0.1% by weight of 2,5-dichlorophenyl 2',5'-dichlorobenzene thiosulfonate in an aqueous solution of 0.1% by weight of blood albumen. Within 24 hours after treatment there was produced severe epinasty in all the tomato plants treated with the aqueous dispersion but there were no signs of phytotoxicity. Other young potted tomato plants were immersed for 30 seconds in an aqueous dispersion containing 0.1% by weight of 4-chlorophenyl 4'-chlorobenzene thiosulfonate in an aqueous solution of 0.1% by weight of blood albumen. Again within 24 hours after treatment there was produced severe epinasty in all these tomato plants but there were no signs of phytotoxicity. It was noted that aqueous dispersions containing 0.25% of the above two active ingredients dispersed in an aqueous dispersion containing 0.1% by weight of blood albumen produced strong nastic response in the tomato plants but again there was no injury to the treated plants.

*Example II*

Aqueous dispersions of 3,4-dichlorophenyl 3',4'-dichlorobenzene thiosulfonate and 2,4,5-trichlorophenyl 2',4',5'-trichlorobenzene thiosulfonate were prepared. Aqueous solutions containing 0.1% by weight of blood albumen were used in preparing each of the aqueous dispersions. The aqueous dispersions of the two active ingredients named were prepared at concentrations of 0.05% and 0.1%. Individual young potted bean plants were dipped for 30 seconds in these four aqueous dispersions. Each potted bean plant was marked to identify it and the treatment it had received. Two weeks after this treatment it was noted that the compositions containing the active ingredients in the concentration of 0.05% by weight had produced only a slight morphogenic response in the bean plants while the aqueous dispersion containing 0.1% by weight of the active ingredients had produced a very marked morphogenic response in that the leaflets had become fused to form halberd shaped leaf units. It has been noted that mature bean plants having this leaf structure instead of the normal trifoliated leaf structure have produced higher yields of beans; hence effecting such a morphogenic response is quite desirable.

Example III

Young tomato plants were dipped into an aqueous dispersion containing 0.1% by weight of phenyl 2,5-chlorobenzene sulfonate and 0.1% by weight of blood albumen. These young tomato plants were placed in a greenhouse for 10 days at which time it was noted that there were rooted primordia 4 inches along the stems. Similar results were noted on young tomato plants that were fed the same dispersion through the soil in the pots.

Example IV

Young tomato plants were dipped for 30 seconds in an aqueous dispersion containing 0.05% by weight of 2,4-dichlorophenyl 2,5-dichlorobenzene sulfonate and 0.1% by weight of blood albumen as the dispersing agent. Within 24 hours a marked nastic curvature was noted in the plants. A similar response was noted in young tomato plants that were fed the same aqueous dispersion through the soil in the pot.

Example V

Young bean plants were dipped in an aqueous dispersion containing 0.05% by weight of 2,4-dichlorophenyl 2,5-dichlorobenzene sulfonate and 0.1% by weight of blood albumen. Within 24 hours a marked nastic curvature was noted in the plants. It was further noted that there was no mildew on the treated bean plants while there was heavy mildew on untreated plants grown under the same conditions as controls.

The above Examples 1 to 5 are concerned with laboratory tests showing that compositions containing the active agents of this invention are capable of stimulating all proliferation in growing plants. Compositions which possess this property are recognized by those skilled in the art as being plant growth regulants and as being useful practically for various applications disclosed hereinbefore.

The following Examples 6 to 8 illustrate some of these practical applications.

Example VI

Bean seeds and tomato seeds were soaked overnight in aqueous dispersion containing 0.01% by weight of 2,5-dichlorophenyl 2',5'-dichlorobenzene thiosulfonate and 4-chlorophenyl 4'-chlorobenzene thiosulfonate. Each of the two aqueous dispersions contained 0.1% by weight of blood albumen as the dispersing agent. These treated tomato seeds and bean seeds were planted in marked rows in flats in a greenhouse. Untreated seeds were also planted at the same time in other marked flats. The treated seeds had germinated and emerged in 10 days after planting while the untreated seeds germinated and emerged in 15 days after planting.

Example VII

Four aqueous compositions were prepared, the first containing 0.025% by weight of 2,5-dichlorophenyl 2,5-dichlorobenzene thiosulfonate and 0.1% by weight of blood albumen. The second contained 0.025% by weight of 4-chlorophenyl 4-chlorobenzene thiosulfonate and 0.1% by weight of blood albumen. The third contained 0.025% by weight of 3,4-dichlorophenyl 3,4-dichlorobenzene thiosulfonate and 0.1% by weight of blood albumen. The fourth contained only 0.1% by weight of blood albumen. Twenty terminal cuttings of chrysanthemums about 6 inches long were dipped into each one of the aqueous compositions. In all 80 chrysanthemum cuttings were used. Each of the four groups of treated cuttings were placed in marked sections of moist sterilized sand and the cuttings were watered daily beginning 24 hours after planting. Twelve days after planting all the cuttings were removed from the sand by carefully washing the sand away from the roots. These cuttings were examined for root growth stimulation. All 60 of the cuttings treated with the compositions of this invention had numerous uniform heavy root growths while the cuttings treated with the water containing blood albumen had but a few sparse roots.

Example VIII

Three apple trees var. Courtland, bearing mature fruit were each sprayed with 30 gallons of an aqueous composition containing 0.025% by weight of 2,5-dichlorophenyl 2',5'-dichlorobenzene thiosulfonate and 0.1% by weight of blood albumen as the dispersing agent. Three different apple trees of the same variety were sprayed with an aqueous composition containing 0.0011% by weight (the recommended concentration) of naphthalene acetic acid (a known plant regulant and used herein for purpose of comparison) and 0.1% by weight of blood albumen at the rate of 30 gallons of spray per tree. Forty-eight hours after spraying all fruit was removed from under the six trees. The apples dropped in the next four days (the third, fourth, fifth and sixth days) after spraying, were counted and recorded for each of the groups. In this four-day period only a total of 171 apples were dropped by the three trees sprayed with the composition of this invention. The three trees sprayed with the naphthalene acetic acid composition had dropped a total of 220 apples.

Other members of the class of active ingredients heretofore enumerated can be employed in the same manner as described in Examples I through VIII. The other members of the preferred class of active ingredients, the esters of halogenated benzene sulfonic and thiosulfonic acids will give substantially the same results as described in the above examples.

Although there have been disclosed specific examples of the compositions of this invention together with specific uses of these specific compositions, I do not desire or intend to limit myself solely thereto, for, as hitherto stated, there may be varied the precise proportions of the active ingredients as well as the precise materials employed as the carriers therefor, and the composition may be used for various plant growth regulating purposes, without departing from the spirit and scope of this invention as defined in the appended claims.

I claim:

1. A plant growth regulant composition which comprises as the essential active ingredient 0.01% to 10% by weight of a halophenyl ester of halobenzene sulfonic acid uniformly dispersed in an aqueous solution containing 0.01% to 1.0% by weight of a wetting and dispersing agent.

2. A plant growth regulant composition which comprises as the essential active ingredient 0.01% to 10% by weight of the halophenyl ester of halobenzene thiosulfonic acid uniformly dispersed in an aqueous solution containing 0.01% to 1.0% by weight of a wetting and dispersing agent.

3. A plant growth regulant composition which comprises as the essential active ingredient 0.01% to 10% by weight of 2,5-dichlorophenyl 2',5'-dichlorobenzene thiosulfonate uniformly dispersed in an aqueous solution containing 0.01% to 1.0% by weight of a wetting and dispersing agent.

4. A plant growth regulant composition which comprises as the essential active ingredient 0.01% to 10% by weight of 2,4-dichlorophenyl 2',5'-dichlorobenzene sulfonate uniformly dispersed in an aqueous solution containing 0.01% to 1.0% by weight of a wetting and dispersing agent.

5. A plant growth regulant composition which comprises as the essential active ingredient 0.01% to 10% by weight of 4-chlorophenyl 4'-chlorobenzene thiosulfonate uniformly dispersed in an aqueous solution containing 0.01% to 1.0% by weight of a wetting and dispersing agent.

6. A plant growth regulant composition which comprises as the essential active ingredient 0.01% to 10% by weight of 3,4-dichlorophenyl 3',4'-dichlorobenzene thiosulfonate uniformly dispersed in an aqueous solution containing 0.01% to 1.0% by weight of a wetting and dispersing agent.

7. A plant growth regulant composition which comprises as the essential active ingredient 0.01% to 10% by weight of 2,4,5-trichlorophenyl 2',4',5'-trichlorobenzene thiosulfonate uniformly dispersed in an aqueous solution containing 0.01% to 1.0% by weight of a wetting and dispersing agent.

8. The method of promoting the germination of plant seeds which comprises soaking the seeds prior to the planting thereof with an aqueous dispersion containing 0.01 to 10% by weight of a compound of the formula Y—SO$_2$—A—Y' wherein Y and Y' are selected from the class consisting of aryl and haloaryl groups and A is selected from the class consisting of oxygen and sulfur atoms, and thereafter maintaining the plant under conditions normally favoring its growth.

9. A plant growth regulant composition which comprises as the essential active ingredient 0.01% to 10% by weight of a compound selected from the class consisting of aryl and haloaryl esters of halobenzene thiosulfonic acids, phenyl-2,5-dichlorobenzene sulfonate and 2,4-dichlorophenyl-2,5-dichlorobenzene sulfonate together with an inert carrier and 0.01 to 1.0% by weight of a wetting and dispersing agent, said active ingredient being uniformly dispersed throughout the inert carrier by means of the wetting and dispersing agent.

10. The method which comprises applying to at least some cells of the plant structure of a living plant, in a concentration sufficient to alter the growth characteristics of the plant, a compound selected from the class consisting of aryl and haloaryl esters of halobenzene thiosulfonic acids, phenyl-2,5-dichlorobenzene sulfonate and 2,4-dichlorophenyl-2,5-dichlorobenzene sulfonate, and thereafter maintaining the plant under conditions normally favoring its growth.

11. The method of promoting the rooting of plant cuttings which comprises dipping the cuttings prior to the planting thereof in an aqueous dispersion containing 0.01% to 10% by weight of a compound selected from the class consisting of aryl and haloaryl esters of halobenzene thiosulfonic acids, phenyl-2,5-dichlorobenzene sulfonate and 2,4-dichlorophenyl-2,5-dichlorobenzene sulfonate and thereafter maintaining the plant under conditions normally favoring its growth.

12. The method of preventing the premature drop of fruit from fruit trees which comprises spraying the trees after formation of the fruit with an aqueous dispersion containing from 0.01 to 10% by weight of a compound selected from the class consisting of aryl and haloaryl esters of halobenzene thiosulfonic acids, phenyl-2,5-dichlorobenzene sulfonate and 2,4-dichlorophenyl-2,5-dichlorobenzene sulfonate and thereafter maintaining the plant under conditions normally favoring its growth.

References Cited in the file of this patent

UNITED STATES PATENTS

| Number | Name | Date |
| --- | --- | --- |
| 2,148,928 | De Meuron | Feb. 28, 1939 |
| 2,528,310 | Hummer | Oct. 31, 1950 |

OTHER REFERENCES

"The Constitution and Toxic Effect of Botanicals . . .," by Lauger, Martin and Miller (Geigy Co., Inc.) April 27, 1944.